(12) United States Patent
Scheres et al.

(10) Patent No.: US 12,358,271 B2
(45) Date of Patent: Jul. 15, 2025

(54) PROCESS FOR MANUFACTURING A MICROFLUIDIC DEVICE

(71) Applicant: SURFIX B.V., Wageningen (NL)

(72) Inventors: Luc Scheres, Wageningen (NL); Rui Pedro Rijo Da Costa Carvalho, Wageningen (NL); Wout Knoben, Wageningen (NL); Johannes Teunis Zuilhof, Wageningen (NL)

(73) Assignee: SURFIX B.V., Wageningen (NL)

( * ) Notice: Subject to any disclaimer, the term of this patent is extended or adjusted under 35 U.S.C. 154(b) by 0 days.

(21) Appl. No.: 18/722,124

(22) PCT Filed: Dec. 21, 2022

(86) PCT No.: PCT/EP2022/087232
§ 371 (c)(1),
(2) Date: Jun. 20, 2024

(87) PCT Pub. No.: WO2023/118292
PCT Pub. Date: Jun. 29, 2023

(65) Prior Publication Data
US 2024/0416638 A1 Dec. 19, 2024

(30) Foreign Application Priority Data
Dec. 21, 2021 (NL) .................... 2030209

(51) Int. Cl.
B01L 3/00 (2006.01)
B32B 3/30 (2006.01)
(Continued)

(52) U.S. Cl.
CPC ........ *B32B 37/12* (2013.01); *B01L 3/502707* (2013.01); *B32B 3/30* (2013.01);
(Continued)

(58) Field of Classification Search
CPC ....................................................... B32B 37/12
(Continued)

(56) References Cited

U.S. PATENT DOCUMENTS

2017/0297018 A1* 10/2017 Rijo da Costa Carvalho ............. G03F 7/0755
2021/0268786 A1 9/2021 Kim et al.

FOREIGN PATENT DOCUMENTS

EP 2460646 A1 6/2012
EP 3502779 A1 6/2019
(Continued)

OTHER PUBLICATIONS

Xie, Y., Photolamination bonding for PMMA microfluidic chips, Microsyst. Technol, 2010, pp. 1887-1891, vol. 16, Springer, DOI 10.1007/s00542-010-1117-6.
(Continued)

*Primary Examiner* — Elizabeth A Robinson
*Assistant Examiner* — Emily R. Berkeley
(74) *Attorney, Agent, or Firm* — Hudak, Shunk & Farine Co. LPA

(57) ABSTRACT

A process for manufacturing a microfluidic device including:
1. providing two substrates which, when assembled, define a microfluidic structure;
2. coating at least one of the surfaces defining the microfluidic structure with a coating composition including:
   a. a monomer A including one moiety represented by $CH_2=CR_1R_2$ wherein $R_1$ represents H or $CH_3$ and $R_2$ represents —COO— or —CONH—, and a non-ionic hydrophilic moiety;
   b. a monomer B including two or more moieties represented by $CH_2=CR_1R_2$ wherein $R_1$ represents H or $CH_3$ and $R_2$ represents —COO— or —CONH—, and a non-ionic hydrophilic moiety;

(Continued)

Uncoated (hydrophobic) COC channel

PEG coated (hydrophilic) COC channel 3. assembling the substrates to obtain a microfluidic structure between the first and the second substrate; and
4. at least partially irradiating the assembly with light to crosslink the liquid coating to bond the substrates and to obtain a crosslinked coating inside the microfluidic structure.

31 Claims, 5 Drawing Sheets

(51) Int. Cl.

| | |
|---|---|
| *B32B 17/10* | (2006.01) |
| *B32B 27/06* | (2006.01) |
| *B32B 27/30* | (2006.01) |
| *B32B 27/32* | (2006.01) |
| *B32B 37/12* | (2006.01) |
| *B32B 37/24* | (2006.01) |
| *C09D 4/00* | (2006.01) |
| *C09D 5/16* | (2006.01) |
| *C09D 7/20* | (2018.01) |
| *C09D 133/14* | (2006.01) |
| *C09D 135/02* | (2006.01) |

(52) U.S. Cl.
CPC .............. *B32B 17/10* (2013.01); *B32B 27/06* (2013.01); *B32B 27/308* (2013.01); *B32B 27/325* (2013.01); *B32B 37/24* (2013.01); *C09D 4/00* (2013.01); *C09D 5/1668* (2013.01); *C09D 7/20* (2018.01); *C09D 133/14* (2013.01); *C09D 135/02* (2013.01); *B01L 2200/12* (2013.01); *B01L 2300/0816* (2013.01); *B01L 2300/161* (2013.01); *B32B 2037/243* (2013.01); *B32B 2255/10* (2013.01); *B32B 2255/26* (2013.01); *B32B 2307/412* (2013.01); *B32B 2307/748* (2013.01); *B32B 2309/12* (2013.01); *B32B 2310/0837* (2013.01); *B32B 2315/08* (2013.01); *B32B 2323/00* (2013.01); *B32B 2333/12* (2013.01)

(58) Field of Classification Search
USPC .......................................... 422/503; 436/180
See application file for complete search history.

(56) References Cited

FOREIGN PATENT DOCUMENTS

| | | |
|---|---|---|
| JP | 2000-248076 A | 9/2000 |
| WO | 2007021762 A2 | 2/2007 |
| WO | 2018027009 A1 | 2/2018 |

OTHER PUBLICATIONS

Tennico, Y., Surface modification-assisted bonding of polymer-based microfluidic devices, Sensors and Actuators B: Chemical, 2010, pp. 799-804, vol. 143, Elsevier B.V., doi: 10.106/j.snb.2009.10.001.

Roy, S., Low-temperature (below Tg) thermal bonding of COC microfluidic devices using UV photografted HEMA-modified substrates: high strength, stable hydrophilic, biocompatible surfaces, J. Mater. Chem., 2011, pp. 15031-15040, vol. 21, The Royal Society of Chemistry, DOI: 10.1039/c1jm11750e.

Jena, R.K., Improvement of thermal bond strength and surface properties of Cyclic Olefin Copolymer (COC) based microfluidic device using the photo-grafting technique, Sensors and Actuators B: Chemical, May 13, 2011, pp. 518-526, Elsevier B.V., doi:10.1016/j.snb.2011.05.012.

* cited by examiner

PROCESS FOR MANUFACTURING A MICROFLUIDIC DEVICE

FIELD OF THE INVENTION

The present invention relates to a process for manufacturing a microfluidic device and the device manufactured thereby.

BACKGROUND OF THE INVENTION

Microfluidic devices allow the manipulation and analysis of small quantities of liquids, generally in the sub-microliter range. To prepare and manipulate such small volumes, channels, reservoirs and other structures with dimensions in the micrometer range are required. The design and manufacture of such devices and the development of enabling (microfabrication) technologies is an integral part of microfluidics.

Microfluidic devices can be used in a wide range of application areas, such as agri-food, pharmacy, security, forensics, and environmental monitoring. A particularly promising and active application area for microfluidics is the field of medical diagnostics. In many cases microfluidic devices are part of miniaturized analytical devices known as 'lab-on-a-chip' (LoC) devices. Such LoC devices enable the direct analysis of a sample at the location where it is collected, i.e. at the Point-of-Need (PoN). In the context of medical diagnostics, the phrase 'Point-of-Care' (PoC) is used to express the fact that the analysis of a biological sample (e.g. blood, saliva, or urine) is performed at a location near the patient instead of in a centralized laboratory.

Microfluidic devices can be made from different materials including silicon, glass, and various types of polymers, such as thermoplastics (e.g. polystyrene, polycarbonate, poly(methyl methacrylate), cyclic olefin (co)polymer or thermoplastic elastomers such as polydimethylsiloxane, thermoset elastomers and other materials.

The fabrication process of a microfluidic device generally comprises the following general steps:
- Creating open channels, reservoirs and other features in a planar substrate by microfabrication processes such as etching, micromilling, embossing, injection moulding, or 3D printing.
- Sealing of the open structures by bonding of a second substrate to the first substrate containing the open structures, thereby creating closed channels, reservoirs etc. with defined dimensions and volumes.
- Creating a fluidic interface that allows liquids to be introduced and extracted from the device, e.g. by connecting tubing, pumps, valves, or other peripheral components and devices.
- Creating an electrical interface between the microfluidic device and other components, i.e. electrodes, sensors, light sources or detectors.

Because of the small dimensions involved, surface interactions and surface properties such as wettability and interactions with biomolecules play a major role in microfluidic devices. Therefore, surface modification is a key enabling technology in microfluidics.

Available methods for surface modification of microfluidic devices include:
- Wet-chemical methods (e.g. physical adsorption, polymer grafting, sol-gel coatings, self-assembled monolayers).
- Gas-phase methods (e.g. chemical vapor deposition, atomic layer deposition).
- Surface modification using high-energy species (e.g. UV, UV/ozone or plasma treatment).

Surface modification can take place either before or after bonding of the device. If bonding is done first, the surface modification must be done in a closed microchannel, which is highly disadvantageous in terms of manufacturability. However, if the surface modification is done before bonding, the bonding process may change the surface properties, or the modified surface may affect the bond strength. Because of these compatibility issues the combination of surface modification of the microfluidic structures with bonding of the device in a scalable manufacturing process is a persistent challenge in the field of microfluidics.

Depending on the materials used and the application of the device, several technologies for bonding microfluidic devices are available. All bonding technologies have their specific benefits and drawbacks, and significant academic and industrial R&D efforts are directed at advancing the state of the art. Regardless of the technology, combining bonding with surface modification in an integrated manufacturing process of a microfluidic device remains a challenging task.

Available bonding technologies include:
- Adhesive bonding: an intermediate 'glue' layer is used to bond two parts. Numerous UV or thermally curable liquid adhesives are available, and (pressure sensitive) adhesive tapes are also used. The use of adhesives may cause issues with uniformity, patterning and clogging.
- Thermal bonding: polymer substrates are heated to their glass transition temperature and pressed together to form a bond. In many cases, temperatures well above 100° C. are required, which may damage pre-deposited coating and/or biological reagents or entities. Another well-known problem with thermal bonding is deformation of channels and other microstructures during bonding.
- Solvent bonding: based on partial dissolution (swelling and softening) of the substrate material by a suitable organic solvent before pressing the parts together. The organic solvents required are not compatible with biological reagents being present before bonding, and also not always compatible with the presence of a coating, which may also dissolve and detach from the surface. Also, reorganization of the surface may take place upon solvent exposure, which may affect the structure and functionality of the coating and can cause deformation of the channels and other microstructures.
- Ultrasonic or laser welding: Localized welding can be done by laser light, but this requires an absorbing substrate. Ultrasound can also be used for local heating and bonding, but this requires the presence of special energy-directing structures for focusing the ultrasonic energy.
- Surface activation: 'activated' surfaces may be created by high-energy surface modification, such as exposure to oxygen plasma or UV/ozone. When these highly reactive surfaces are pressed together a bond is formed, but the activation process will destroy any coating present on the surface. Note that plasma or UV/ozone treatment are also commonly used as a surface cleaning step prior to bonding.

Note that the substrates to be bonded do not need to be of the same material. Different materials can be bonded to create hybrid microfluidic devices. For example, a polymer foil can be used to seal a glass substrate with microfluidic structures, or a silicon biosensor chip can be integrated with a polymer microfluidic device, for example as an extra layer to a microfluidic structure.

Others have recognized the challenges associated with the combination of bonding and surface modification of microfluidic devices. For example, in EP2460646 it is mentioned that "in general, chemical modification of the inner face of the channel is carried out after bonding and formation of the channel, and thus the procedure becomes complicated. Chemical modification of the inner face of the channel is sometimes preferred for the purpose of generating an electroosmotic flow (EOF) inside the capillary channel . . . "

To overcome this problem, EP2460646 describes "a device that decreases deformation during manufacturing of the device, providing a firm joint between the substrates without use of an adhesive, and that allows chemical modification of a channel during manufacturing of the device". Specifically, the invention disclosed is "an electrophoresis device comprising two joined substrates in which a concavity is provided in at least one of the opposing surfaces of the two substrates whereby to form a channel within the device, wherein the two substrates are covalently bonded via a crosslinking agent (A) which is ionic, and the crosslinking agent (A) is exposed on an inner wall surface of the channel."

The method described in EP2460646 is exemplified by manufacturing a device made of PMMA substrates and using de-N-acetylated chondroitin sulfate, an anionic polysaccharide containing amino groups, as the crosslinking agent (A). Before bringing the crosslinking agent (A) into contact with the substrates, several preceding steps have to be taken to first activate the PMMA substrates by vacuum ultraviolet rays, then introduce amino groups on the activated surfaces by dipping the substrate in an aqueous solution of aminopropyltrimethoxysilane for 1 hour at 30° C., and then introduce aldehyde groups on the aminated surfaces by dipping the substrate in an aqueous solution of glutaraldehyde for 2 hours at 37° C. Only after all these steps, the crosslinking agent (A) is applied on the substrates, which are then placed on top of each other and joined together by applying heat and pressure (60° C., 20 kPa, reaction time not specified). After the reaction, unreacted aldehyde groups in the channel have to be deactivated by flushing amidosulphuric acid through the channel at 37° C. (reaction time not specified).

From the foregoing, it is clear that the multi-step procedure described in EP2460646 is quite complicated and time-consuming. Moreover, while the purpose of the method is to avoid chemical surface modification after formation of the channel, a reagent solution still has to be flushed through the channel after its formation to deactivate (i.e. to react with) remaining aldehyde groups. Thus, the method does not actually provide a way to avoid the complexities associated with the chemical modification of the inner face of a channel after its formation. Nor does the process allow the presence of sensitive moieties, like chemical or biological reagents, in the channel prior to this step.

Another method for fabricating microfluidic devices is described in WO200721762. In this document, several drawbacks of using the elastomer polydimethylsiloxane (PDMS) for the fabrication of microfluidic devices are mentioned, most importantly the fact that PDMS swells in most organic solvents. Therefore, curable fluoropolymers, specifically perfluoropolyether (PFPE), are proposed as alternative elastomeric materials that combine the favourable mechanical properties of PDMS with an increased resistance to organic solvents.

In FIGS. 3 and 4 of WO200721762 it is described how PFPE substrates can be adhered to each other or to other substrate materials. The method comprises the steps of treating the substrates to create reactive groups on their surfaces. The treated surfaces are then contacted and treated to form a bond between the substrates.

WO200721762 describes polymer compositions comprising fluoropolymers with curable functional groups for the fabrication of microfluidic devices. Fluoropolymers such as PFPE are highly hydrophobic elastomers. Their high chemical resistance may provide a benefit over other materials such as PDMS for certain applications involving organic solvents. However, due to the hydrophobic nature of PFPE high pressures will needed for actively pumping biological (aqueous) liquids through such microfluidic devices, while hydrophobic surfaces are also known to suffer from undesired biofouling. Especially for microfluidic devices involving the passive flow of biological (aqueous) liquids, hydrophilic surfaces are desired, since these might 1) reduce biofouling within channels; 2) can minimize gas nucleation and subsequent gas bubble inclusion or formation and; 3) facilitate passive (capillary) flow of aqueous solutions through the channels. Furthermore, fluoropolymers are generally not used for such applications because of their non-ideal chemical and physical properties (e.g. mechanical strength, optical transparency, and gas permeability). Finally, perfluorinated compounds like PFPE are recognized as long-term environmental pollutants and are therefore undesired for large scale application in consumable microfluidic PoC devices.

An interesting method for bonding polymer substrates is photolamination, which combines photografting of monomers onto a surface and photopolymerization of monomers in the bulk. It has been shown that photolamination can be used for bonding PMMA-based microfluidic devices (Y. Xie, Y. Xu, K.-L. Yung, L.-B. Huang, and M.-H. Lee, "Photolamination bonding for PMMA microfluidic chips," Microsystems Technol., vol. 16, pp. 1887-1891, 2010, doi: 10.1007/s00542-010-1117-6). In this process, a PMMA substrate with embossed microfluidic structures is bonded to a flat PMMA cover plate. The cover plate is exposed to a reactive vapor of acrylic acid containing benzophenone as a photo-initiator at 60° C., resulting in adsorption of acrylic acid and benzophenone to the PMMA surface. The cover plate is then contacted with the microfluidic substrate, and the two substrates are pressed together and exposed to UV irradiation for 20 minutes.

The photolamination method as described above results in strong bonding of the PMMA substrates. However, the process also has several disadvantages. The vapor-phase adsorption of monomer and photo-initiator is time consuming and cumbersome, especially since it has to be carried out at elevated temperature. The method is fully focused on bonding and does not have the goal of modifying the full inner surface of the channel in the process, i.e., it leaves three channel walls uncoated. In fact, after the photolamination process, the only channel wall coated comes from the cover plate and is covered with a polyacrylic acid (PAA) polymer coating. Since PAA is ionic and negatively charged at physiological buffer conditions (i.e., buffers with pKs near the pH of blood) especially the PAA coated cover plate channel wall will suffer from undesired biofouling.

In JP20002248076A, micro chemical devices are described that are formed from a part A and a part B, which are adhered to each other by providing at least one of part A or part B with a curable coating composition that is pre-cured before contacting part A and part B. The examples show that without pre-curing the micro-channels in the micro chemical device are clogged and/or that leakages occur after adhering part A and part B.

Other bonding methods comprising photografting of (meth)acrylic monomers are also known (R. K. Jena, C. Y. Yue, and L. Anand, "Improvement of thermal bond strength and surface properties of Cyclic Olefin Copolymer (COC) based microfluidic device using the photo-grafting technique," Sensors Actuators B. Chem., vol. 157, no. 2, pp. 518-526, 2011, doi: 10.1016/j.snb.2011.05.012; S. Roy, C. Y. Yue, S. S. Venkatraman, and L. L. Ma, "Low-temperature (below $T_g$) thermal bonding of COC microfluidic devices using UV photografted HEMA-modified substrates: high strength, stable hydrophilic, biocompatible surfaces," J. Mater. Chem., vol. 21, pp. 15031-15040, 2011, doi: 10.1039/c1jm11750e). In these cases, a polymer layer is first created on COC substrates by photografting from a monomer solution, followed by extensive rinsing to remove unreacted monomer and photo-initiator, and ungrafted polymer chains. After drying, the substrates are thermally bonded at temperatures up to 130° C. In these methods, surface modification and bonding are therefore clearly two separate and independent steps. Moreover, the extensive rinsing and drying required after the surface modification (photografting) step make these methods very time-consuming and impractical for large scale industrial application.

Instead of grafting organic polymers, inorganic precursors such as tetraethyl orthosilicate (TEOS) can also be used for surface modification and bonding of microfluidic devices (Y. H. Tennico, M. T. Koesdjojo, S. Kondo, D. T. Mandrell, and V. T. Remcho, "Surface modification-assisted bonding of polymer-based microfluidic devices," Sensors Actuators, B Chem., vol. 143, no. 2, pp. 799-804, 2010, doi: 10.1016/j.snb.2009.10.001). In this case, substrate surfaces are activated by exposure to oxygen plasma and then silanized by immersion in a TEOS solution at 50° C. for 30 minutes, thus creating a $SiO_2$ layer on the surface. After a second plasma treatment to oxidize and hydroxylate the $SiO_2$ surface, substrates are bonded by pressing them together at elevated temperatures (75-110° C., depending on the materials) for at least 20 minutes. Bonded devices are post-annealed by baking at 60° C. for 2 hours.

This process results in bonded microfluidic devices with chemically modified channels. However, also in this method surface modification and bonding are clearly two separate and independent steps. Moreover, the process comprises at least five steps and is therefore laborious and time-consuming, which limits its practical applicability. Also, preloading of biological reagents in the microfluidic structure prior to bonding is hampered by the thermal annealing steps required and furthermore $SiO_2$ surfaces are known to suffer from undesired biofouling.

In a recent publication, EP3502779, Levkin and co-workers describe polymethacrylate hydrogels created by polymerization of mixtures of mono- and di-methacrylates containing ethylene glycol moieties. Dilute aqueous solutions (water content 80 wt. %) of these monomers are prepared and polymerized to form poly(ethylene glycol) (PEG) hydrogels. It is observed that the hydrogels are photodegradable, i.e. they lose their mechanical strength, and the hydrogels turn back into a liquid upon exposure to UV light.

Based on these results, mixtures of PEG mono- and di-(meth)acrylates would not seem an obvious choice for photochemical bonding of microfluidic devices. However, in the process according to the current invention, the combination of PEG mono- and multi-(meth)acrylates surprisingly proves to be optimal for bonding of polymer microfluidic devices, while at the same time providing a hydrophilic, anti-biofouling (i.e. protein-repellent) coating to the inner wall of the microfluidic structures.

SUMMARY OF THE INVENTION

It is an objective of the present invention to provide a process for manufacturing a microfluidic device in which the above-described and/or other needs are met.

In some cases, it is an objective of the present invention to provide a process for manufacturing a microfluidic device at least partly based on a polymer, in particular a thermoplastic polymer. Such microfluidic device can be produced in large quantities at low cost by injection molding of a polymer. In many cases, these devices are to be used in combination with biological samples, i.e. aqueous liquids containing biomolecules (e.g. proteins or nucleic acids), cells, microorganisms, and/or viruses.

However, all common thermoplastics used in microfluidics are hydrophobic. Proteins and other biomolecules tend to adsorb to these materials, causing biofouling. Moreover, a hydrophilic surface is required to facilitate passive (capillary) flow of aqueous liquids through the device. Thermoplastic microfluidic devices with a hydrophilic interior are especially attractive for PoC applications since the passive flow will obviate the need external pumps for flow activation.

Therefore, in one aspect, it is an objective of the present invention to provide a fast, easy and scalable process for manufacturing a microfluidic device comprising a microfluidic structure made of a polymer, in particular a thermoplastic polymer, provided with a hydrophilic, anti-biofouling (i.e. protein-repellent) coating of its inner surface in which the above-described and/or other needs are met.

Accordingly, the present invention provides a process for manufacturing a microfluidic device comprising:
  a) providing a first substrate having a first surface comprising a first flat part and a first concavity and a second substrate having a second surface comprising a second flat part and an optional second concavity, wherein each of the first flat part, the first concavity and the second flat part has surface groups selected from alcohol, aldehyde, carboxylic acid, ether, epoxide, alkene, alkyne, secondary or tertiary carbon atoms, arynes, azides, imines, phosphates, sulfonyl fluorides, N-sulfonylimines, vinylsilyl, quinones, phenones, and hydrazones, or a combination thereof;
  b) coating at least one of the first surface and the second surface with a coating composition comprising
    i) a monomer A comprising one moiety represented by $CH_2=CR_1R_2$ wherein $R_1$ represents H or $CH_3$ and $R_2$ represents —COO— or —CONH—, and a non-ionic hydrophilic moiety;
    ii) a monomer B comprising two or more moieties represented by $CH_2=CR_1R_2$ wherein $R_1$ represents H or $CH_3$ and $R_2$ represents —COO— or —CONH—, and a non-ionic hydrophilic moiety;
    iii) optionally a photoinitiator; and
    iv) optionally a diluent;
  c) evaporating the diluent, if present, and forming a liquid coating;
  d) contacting the substrates so as to obtain an assembly in which the first flat part and the second flat part contact each other to define a microfluidic structure between the first and the second surfaces, wherein the microfluidic structure comprises the first concavity and the optional second concavity; and e) at least partially irradiating the assembly with light having a wavelength between 200 and 800 nm to crosslink the liquid coating to bond the first flat part and the second flat part and obtain a crosslinked coating on at least the first concavity, wherein at least one of the first substrate and the second substrate is transparent to said light.

Preferably the crosslinked coating is transparent (transmission >80%) to light with a wavelength between 350 and 700 nm. Transmission is measured by subtracting the transmission of the substrate as such from the transmission of the same substrate with the crosslinked coating.

Preferred surface groups are alcohol, aldehyde, carboxylic acid, ether, epoxide, alkene, alkyne, and secondary or tertiary carbon atoms, or a combination thereof.

More preferred surface groups are selected from alcohol, aldehyde, carboxylic acid, ether, alkene and alkyne, and secondary or tertiary hydrocarbons.

According to the process of the present invention, the bonding of the substrates and the surface modification of the microfluidic structure are achieved in one step. Accordingly, the process of the present invention does not have the various disadvantages related to the bonding before or after the surface modification of microfluidic structures. Further, the process of the present invention does not have disadvantages related to the use of an adhesive, solvent or heat for bonding. In the microfluidic device according to the invention, the substrates are strongly bonded, the interior is coated hydrophilic, and the device has a good optical transparency.

Another advantage of the process according to the invention is that the channels of the microfluidic device can be modified by choosing the thickness of the coating composition to be applied: a very thin layer of coating composition will follow the structure of the channels of the microfluidic device, while a thicker layer of coating composition may result in rounded channels, which can reduce corner flow in a channel and microbubble formation, after crosslinking of the coating composition. A thin layer is typically less than 100 nm. A thick layer is typically larger than 100 nm.

The entire process of obtaining a suitably modified microfluidic device thus implies the following process steps:

In step a) two substrates are provided which are arranged to be bonded to form a microfluidic device defining a microfluidic structure between their surfaces. Each of the surfaces comprises a flat part arranged such that these flat parts can be bonded to each other. At least one of the surfaces further comprises a concavity. The substrate which comprises a concavity is herein referred as a first substrate. The other substrate which may or may not have a concavity is herein referred as a second substrate.

At least one of the first substrate and the second substrate is transparent to light used in step e) for crosslinking the liquid coating. The term "transparent" herein means that sufficient light can pass through the substrate such that the crosslinking of the coating can be activated. The wavelength of the light to be used for crosslinking the liquid coating typically ranges between 250 and 700 nm.

In step b) at least one of the first surface and the second surface is coated with a coating composition. When present, the second concavity is also preferably coated with the coating composition or can for example be precoated in a different preparation step of substrate 2.

In step c) the diluent (if present) is evaporated. Evaporation of the diluent may also partially or completely occur during step b), for example when the coating composition is applied using spin coating or spray coating.

In step d) the first and the second flat parts are contacted to each other such that a microfluidic structure is defined between the surfaces of the substrates. The microfluidic structure in the microfluidic device of the invention is thus defined by the concavity and the part of the surface opposing the concavity. The microfluidic structure comprises the first concavity (and the second concavity if present). Accordingly, an assembly is formed in which a liquid coating is provided between the flat parts of the surfaces and on the first concavity.

Preferably, step c is immediately followed by step d), thus, without any intermediate step. In particular, pre-curing of the liquid coating on the at least one substrate obtained in step c) is not needed.

In step e) the liquid coating is crosslinked. The crosslinking of the liquid coating between the first and the second flat parts results in the bonding of the substrates by the formation of a crosslinked coating, i.e., a polymer network covalently grafted to the surfaces of the substrates, thus creating a chemical bond between the substrates and effectively sealing the microfluidic device. The crosslinking of the liquid coating on the first concavity (and any coating on the second concavity if present) results in the formation of a surface-modified microfluidic structure. The crosslinked coating thus formed on the inner surface of the microfluidic structure gives hydrophilic and antibiofouling (i.e. protein-repellent) surface properties. Accordingly, the bonding of the substrates and the surface modification of the microfluidic structure are advantageously achieved simultaneously by the process according to the present invention.

Step a)

In step a), first and second substrates are provided. The microfluidic device according to the invention may further comprise a third substrate, like for example a plastic carrier having a silicon chip.

The first substrate has a first surface comprising a first flat part and the second substrate has a second surface comprising a second flat part. The first surface comprises a first concavity. The second surface may or may not comprise a second concavity. It will be appreciated that the term "first concavity" is meant as open channels, recesses and/or grooves forming a structure on the first surface and "second concavity" is meant as recesses and grooves forming a structure on the second surface.

The substrate having the concavity may be provided by known methods, such as by creating open channels, reservoirs and other features in a planar substrate by microfabrication processes such as etching, micromilling, embossing, injection moulding, or 3D printing.

The first and/or the second substrates may further comprise components such as electrodes, optical waveguides, nanowires, which may be provided on the first and or second surface and may be integrated into the microfluidic device.

The first and/or the second substrates may e.g. be part of a sensor chip, for example a biosensor chip. A specific example is a photonic chip comprising waveguide structures.

The first and the second substrates may be made of the same material or may be made of dissimilar materials.

The first and/or the second substrates may be made of a polymer or an inorganic material, preferably a polymer, more preferably a thermoplastic polymer. Use of polymers has an advantage that the microfluidic device can be produced in large quantities at low cost e.g. by injection molding of a polymer.

In some specific embodiments, the first substrate is made of a polymer and the second substrate is made of a polymer. In some specific embodiments, the first substrate is made of a polymer and the second substrate is made of an inorganic material. In some specific embodiments, the first substrate is made of an inorganic material and the second substrate is made of a polymer. In some specific embodiments, the first substrate is made of an inorganic material and the second substrate is made of an inorganic material.

Examples of suitable polymers include polyolefins, polyesters, polyethers, polyamides, polycarbonates, polysulfones, polyurethanes, (meth)acrylates, (meth)acrylamides, polysaccharides, and polyalcohols.

More specific examples of suitable polymers include cyclic olefin copolymer (COC), cyclic olefin polymer (COP), polycarbonate (PC), polystyrene (PS), poly(methyl methacrylate) (PMMA), SU-8, polyethylene and polypropylene.

Examples of suitable inorganic material include glass, silicon, silicon oxide, and silicon nitride.

Each of the first flat part, the first concavity and the second flat part has at least partially surface groups selected from alcohol, aldehyde, carboxylic acid, ether, epoxide, alkene, alkyne, secondary or tertiary carbon atoms, arynes, azides, imines, phosphates, sulfonyl fluorides, N-sulfonylimines, vinylsilyl, quinones, phenones, and hydrazones, or a combination thereof. Preferred surface groups are alcohol, aldehyde, carboxylic acid, ether, epoxide, alkene, alkyne, and secondary or tertiary carbon atoms, or a combination thereof.

When present, the second concavity preferably has at least partially surface groups selected from alcohol, aldehyde, carboxylic acid, ether, epoxide, alkene, alkyne, secondary or tertiary carbon atoms, arynes, azides, imines, phosphates, sulfonyl fluorides, N-sulfonylimines, vinylsilyl, quinones, phenones, hydrazones, or a combination thereof. Preferred surface groups are alcohol, aldehyde, carboxylic acid, ether, epoxide, alkene, alkyne, and secondary or tertiary carbon atoms, or a combination thereof. The surface groups in the flat parts enhance bonding of the substrates, i.e. these surface groups react with the monomers via surface grafting, resulting in covalent bonding of the crosslinked coating to the surfaces. In the flat areas this enhances bonding of the substrates, in the concavity this enhances adhesion of the crosslinked coating.

It is possible to (commercially) obtain substrates having the required surface groups. However, it is also possible to obtain substrates having the required surface groups by a suitable treatment of the substrates which do not comprise these surface groups. It is also possible to subject substrates having the required surface groups to a suitable treatment to increase the number of the functional groups.

Accordingly, step a) may involve treating the first and/or second substrates to create the functional groups and/or increasing the number of the functional groups. Such treatments are known as surface activation processes. Surface activation can for example be achieved by oxidation of the surface by exposure to an air or oxygen plasma, UV/ozone treatment, and/or application of an oxidizing solution.

In some cases, the first substrate and/or the second substrate is made of an inorganic material and optionally subjected to surface activation to create the surface groups.

Several methods for the chemical surface modification of inorganic materials are known. For example, it is well known that oxide surfaces can be modified by reaction with alkoxy-, chloro- or hydrosilanes, phosphonates, carboxylic acids, catechols, alkenes, alkynes, or amines, as described in S. P. Pujari, L. Scheres, A. T. M. Marcelis, and H. Zuilhof, "Covalent surface modification of oxide surfaces," Angew. Chemie—Int. Ed., vol. 53, no. 25, pp. 6322-6356, 2014.

Step b)

In step b), at least one of the first surface and the second surface is coated with a coating composition.

Step b) may be performed e.g. by drop casting, dip coating, spin coating, or spray coating.

Preferably, all parts of the first surface and the second surface which are to define the microfluidic structure in step d) are coated with the coating composition.

Step b) may be performed as one of the following:

When the second surface comprises a second concavity:
the first concavity and the first flat part and the second flat part and the second concavity are coated; see FIG. 10.
the first concavity and the first flat part are coated and the second flat part and the second concavity are not coated; see FIG. 11.

When the second surface does not comprise a second concavity:
the first concavity and the first flat part and the second flat part are coated; see FIG. 7.
the first concavity and the first flat part are coated and the second flat part is not coated; see FIG. 8.
the first concavity and the first flat part are not coated and the second flat part is coated; see FIG. 9.

In a preferred embodiment when the second surface comprises a second concavity:
the first concavity and the first flat part and the second flat part and the second concavity are coated.

In another preferred embodiment, when the second surface does not comprise a second concavity:
the first concavity and the first flat part and the second flat part are coated; or
the first concavity and the first flat part are coated and the second flat part is not coated.

The coating composition comprises a monofunctional monomer A, a multifunctional monomer B, optionally a photoinitiator and optionally a diluent. Preferably at least 90 vol % of the coating composition consists of monofunctional monomer A, multifunctional monomer B, photoinitiator and diluent.

More preferably at least 95, or 98, or 99 vol % of the coating composition consists of monofunctional monomer A, multifunctional monomer B, photoinitiator and diluent.

The irradiation with light causes reaction of the monomers possibly by activation of the photoinitiator, resulting in simultaneous surface grafting and polymerization and formation of a crosslinked polymer network. The combination of monofunctional monomer and multifunctional monomers in the composition results in the formation of a crosslinked polymer network. The crosslink density can be tuned by changing the ratio between mono- and multifunctional monomers, as well as the number of functionalities in the multifunctional monomer, and the number or length of the non-ionic hydrophilic moieties in the monomers.

The process according to the present invention benefits from using a mixture of mono- and multifunctional monomers. If only a monofunctional monomer is used, some photografting onto the surface occurs, but no crosslinking takes place. This results in a relatively weak bond between the substrates. If only a multifunctional monomer is used, a highly crosslinked polymer network is formed and strongly bonded substrates are obtained. However, the use of only multifunctional monomers results in opaqueness and therefore a reduction of the optical transparency of the microfluidic devices. This is undesirable for many applications, which rely on optical methods for signal detection from the microfluidic device.

When using a mixture of mono- and multifunctional monomers, both strong bonding and optical transparency can be achieved. Therefore, the process according to the present invention specifically uses a mixture of mono- and multifunctional monomers.

The coating composition comprises a monomer A comprising one moiety represented by $CH_2=CR_1R_2$ wherein $R_1$ represents H or $CH_3$ and $R_2$ represents —COO— or —CONH—, and a non-ionic hydrophilic moiety.

Preferably, the monomer A is selected from acrylate, methacrylate, acrylamide or methacrylamide monomers, more preferably selected from acrylate and methacrylate monomers, most preferably selected from acrylate monomers.

Preferably, the non-ionic hydrophilic moiety in the monomer A is made of repeating units selected from ethylene glycol, propylene glycol, or glycerol, or oligomers of (2-hydroxyethyl)acrylate, (2-hydroxyethyl)methacrylate, (2-hydroxyethyl)acrylamide, (2-hydroxyethyl)methacrylamide. (2-hydroxypropyl)acrylate, (2-hydroxypropyl)methacrylate, (2-hydroxypropyl)acrylamide, (2-hydroxypropyl)methacrylamide, N-isopropylacrylamide, 2-methyl-2-oxazoline, 2-ethyl-2-oxazoline, N-vinylpyrrolidone, N-vinyl acetamide, vinyl alcohol, vinyl acetate, vinyl butyral or amino acids. Preferably the non-ionic hydrophilic moiety in the monomer A is made of repeating units of ethylene glycol.

Particularly preferably, the monomer A is a monofunctional acrylate monomer containing a non-ionic hydrophilic moiety made of repeating units of ethylene glycol.

The coating composition comprises a crosslinking monomer B comprising two or more moieties represented by $CH_2=CR_1R_2$ wherein $R_1$ represents H or $CH_3$ and $R_2$ represents —COO— or —CONH—, and one or more non-ionic hydrophilic moieties.

Preferably, the number of moieties represented by $CH_2=CR_1R_2$ in the monomer B is between 2 and 8, preferably between 2 and 4.

Preferably, the monomer B is selected from acrylate, methacrylate, acrylamide or methacrylamide monomers, more preferably selected from acrylate and methacrylate monomers, most preferably selected from acrylate monomers.

Particularly preferably, the monomer B is a bifunctional acrylic monomer, i.e. it comprises 2 acrylic groups.

Preferably, the non-ionic hydrophilic moiety in the monomer B is made of repeating units selected from ethylene glycol, propylene glycol, or glycerol, or oligomers of (2-hydroxyethyl)acrylate, (2-hydroxyethyl)methacrylate, (2-hydroxyethyl)acrylamide, (2-hydroxyethyl)methacrylamide. (2-hydroxypropyl)acrylate, (2-hydroxypropyl)methacrylate, (2-hydroxypropyl)acrylamide, (2-hydroxypropyl)methacrylamide, N-isopropylacrylamide, 2-methyl-2-oxazoline, 2-ethyl-2-oxazoline, N-vinylpyrrolidone, N-vinyl acetamide, vinyl alcohol, vinyl acetate, vinyl butyral or amino acids. Preferably the non-ionic hydrophilic moiety in the monomer B is made of repeating units of ethylene glycol.

Particularly preferably, the monomer B is a bifunctional acrylate monomer containing a moiety made of repeating units of ethylene glycol. Preferably monomer B is a diacrylate, wherein the acrylate moieties are bridged with repeating units of ethylene glycol.

Preferably, the number of the repeating units in the non-ionic hydrophilic moiety in the monomer A or the monomer B is selected between 1 and 20. Preferably it is between 2 and 10. In a preferred embodiment, the monomer A has preferably 6-10 ethylene glycol units, more preferably 7-9 ethylene glycol units, most preferably 9 ethylene glycol units and the monomer B has preferably 1-5 ethylene glycol units, more preferably 2-4 ethylene glycol units, most preferably 3 ethylene glycol units. Preferably, the monomers A and B are both liquid at room temperature, with a viscosity<1000 mPa s, preferably <500 mPa s, more preferably <200 mPa s, and more preferably <100 mPa s.

Preferably, the amount of monomer A ranges between 5 and 90 vol % or 10 and 90 vol %, preferably 10 to 50 vol %, more preferably 20 to 40 vol %, for example 25 to 35 vol %, relative to the total volume of the monomers A and B.

Preferably, the amount of monomer B ranges between 10 to 95 vol % or 10 and 90 vol % relative to the total volume of the monomers A and B.

When mixtures of varying ratios of mono- and multifunctional acrylic monomers with PEG moieties were used, for example mixtures comprising monomer A between 5-90 vol % and monomer B between 10 and 95 vol %, preferably between 20-60 vol % monomer A, more preferably between 25-50 vol % monomer A, it was surprisingly found that strong bonding was achieved without seriously compromising the optical transparency of the crosslinked coating.

Preferably the transmission of light for the crosslinked coating on a substrate is >80% for all wavelengths between 320 and 800 nm, relative to the incident light.

In some embodiments, the coating composition comprises a photo-initiator. When present, the amount of the photo-initiator is e.g. 0.1 to 10 wt. % relative to the total weight of the monomers A and B and the photo-initiator. Examples of the suitable photo-initiator include photoinitiators of Norrish type I (for example, acetophenones or phosphine oxides) and of Norrish type II (for example, benzophenones). Specific examples of the suitable photo-initiator include 2-hydroxy-4'-(2-hydroxyethoxy)-2-methylpropiophenone, diphenyl(2,4,6-trimethylbenzoyl) phosphine oxide, 2,2-Dimethoxy-2-phenylacetophenone, benzophenone, and perfluorobenzophenone.

In some embodiments, the coating composition comprises a diluent, which may also be referred to as a thinner or a solvent. The amount of the diluent may vary depending on the application method. For example, for application by spin coating, the amount of the diluent relative to the total volume of the coating composition is typically between 0.1 and 20 vol %. For example, for application by spray coating, the amount of the diluent relative to the total volume of the coating composition is typically between 25 and 99 vol %, or between 50 and 99 vol %.

The presence of a diluent in the coating composition may have several effects. For example, the presence of the diluent may reduce the viscosity of the coating composition, which may facilitate the deposition of the coating composition on the substrate. Also, the diluent may facilitate the spreading of the coating composition over the surface of the substrate, including the microfluidic structures. The diluent may also serve to soften the substrate when it is a polymer substrate, which may result in an increased bond strength at lower applied pressure.

Suitable diluents must be miscible with and not chemically reactive towards the monomers A and B, the photo-initiator (if present), and any other components of the coating composition. Furthermore, they must not negatively affect the optical properties of the substrates, and/or the integrity of the microfluidic structures. As such, the selection of a suitable diluent depends on the substrate material and the components of the coating composition. Examples of suitable diluent include tetrahydrofuran, diethyl ether, methanol and ethanol, diethylene glycol diethyl ether, diethylene glycol dimethyl ether, dioxane, 2-butanone, dimethoxyethane, ethyl acetate, methoxyacetone, propylene glycol monomethyl ether acetate, methyl isobutyl ketone, ethyl butyrate, methoxy propyl acetate, propyl acetate, 2-butoxyethyl acetate. When using COC as a substrate material, tetrahydrofuran (THF) or diethyl ether is preferred.

Step c)

If the coating composition of step b) comprises the diluent, the process according to the invention comprises step c) of evaporating the diluent. Preferably, the amount of the diluent in the liquid coating on the substrate after evaporation is less than 5 vol %, preferably less than 2 vol %, more preferably less than 1 vol %, or less than 0.1 vol %, relative to the liquid coating.

The thickness of the liquid coating is between 100 nm and 20 µm, preferably between 200 nm and 10 µm, more preferably between 500 nm and 5 µm. The liquid coating on first and second substrate do not need to be of the same composition or thickness.

Preferably, step c is immediately followed by step d), thus, without any intermediate step. In particular, pre-curing of the liquid coating on the at least one substrate obtained in step c) is not needed.

Step d)

In step d), the first and the second flat parts are contacted to each other such that a microfluidic structure is defined between the surfaces of the substrates. The microfluidic structure comprises the first concavity and the second concavity (if present). Accordingly, an assembly is formed in which a liquid coating is provided between the flat parts of the surfaces and on the first concavity.

The microfluidic structure may e.g. be channels or reservoirs.

Step d) may be performed while applying an external pressure or without applying an external pressure. External pressure may be applied for example to assist spreading of the liquid coating, or to reduce the thickness of the liquid coating between the substrates to be bonded.

Preferably, the first and the second flat parts are contacted to each other without precuring the liquid coating formed in step c).

Preferably, the applied external pressure is below 0.8 MPa, more preferably below 0.4 MPa and in particular below 0.2 MPa. Most preferably, no external pressure is applied.

Preferably, step d) is performed such that the microfluidic structure is not completely filled by the liquid coating. If the inner structures are filled by the liquid coating in case of an excess of liquid coating, this may be mitigated e.g. by removing excess liquid coating from the microfluidic structures after the assembly is formed. This may be achieved e.g. by applying a positive or a negative air pressure to the assembly, thus blowing or sucking excess liquid coating out of the microfluidic structure.

Step e)

In step e), the liquid coating is crosslinked to bond the first flat part and the second flat part and obtain a crosslinked coating on at least one of the top and bottom wall of the microfluidic channel.

The crosslinking of the liquid coating is performed by irradiation of light with a wavelength of 200 to 800 nm, preferably 250 to 400 nm, more preferably 320 to 400 nm.

The energy needed for crosslinking the liquid coating is preferably at least 10 mJ/cm$^2$, when irradiation of light having a wavelength between 250-400 nm is applied.

At least one of the first and the second substrates is transparent to the light used for the crosslinking.

The duration of the irradiation may be up to 60 minutes or longer. Preferably, the irradiation time is less than 30 minutes, more preferably less than 15 minutes. When a photo-initiator is present in the coating composition, the irradiation time may be reduced to less than 10 minutes, preferably less than 5 minutes. Depending on the required bond strength, the irradiation time may be further reduced to less than 3 minutes, or even down to less than 1 minute, for example between 5 and 55 seconds.

Step e) may be performed while applying an external pressure or without applying an external pressure. External pressure may be applied to ensure full and intimate contact between the substrates. This can be beneficial for example when substrates are not completely flat. However, application of external pressure is not required for successful bonding. It was observed that a strong bond is formed even when step e) is performed without applying any external pressure.

Preferably, the applied external pressure is below 0.8 MPa, more preferably below 0.4 MPa and in particular below 0.2 MPa. Most preferably, no external pressure is applied.

Step e) may be performed while blowing or sucking a flow of e.g. air or nitrogen through the microfluidic structure. This ensures that the microfluidic structure is not clogged during irradiation.

In some embodiments of the invention, the assembly is partially irradiated. This may be achieved for example by using a photomask which prevents the irradiation of selected areas within the assembly.

DETAILED DESCRIPTION OF THE INVENTION

Figure 1:
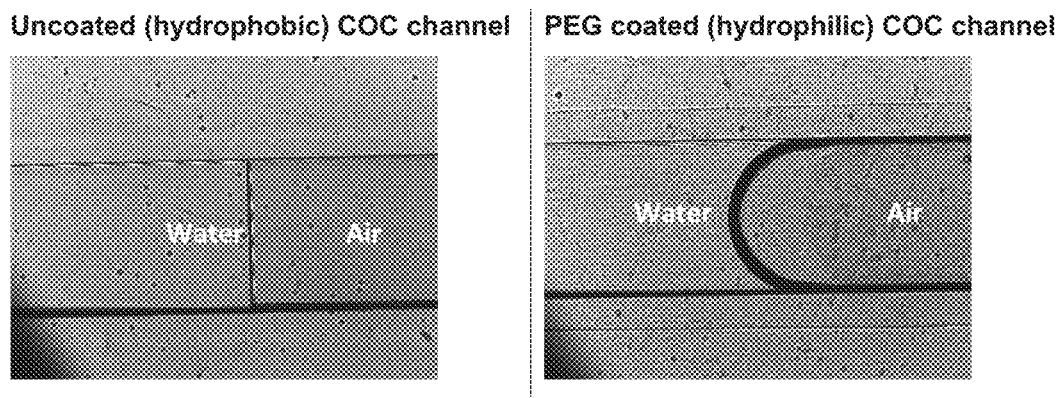
FIG. 1 shows a comparison between a coated and uncoated COC channel: left) water in an untreated COC channel (hydrophobic, indicated by the WCA of approximately 90°), (right) water in a PEG-coated channel (hydrophilic, indicated by the WCA of <40°).

The invention also relates to a microfluidic device, having a bottom part (10), a top part (20) and a channel (30). The channel is defined by a bottom wall (31), sidewalls (32) and optionally (34) and top wall (33). Bottom part (10) and top part (20) are bonded together with a crosslinked composition, and at least one of the walls of the channel is coated with the crosslinked composition.

Figure 8:
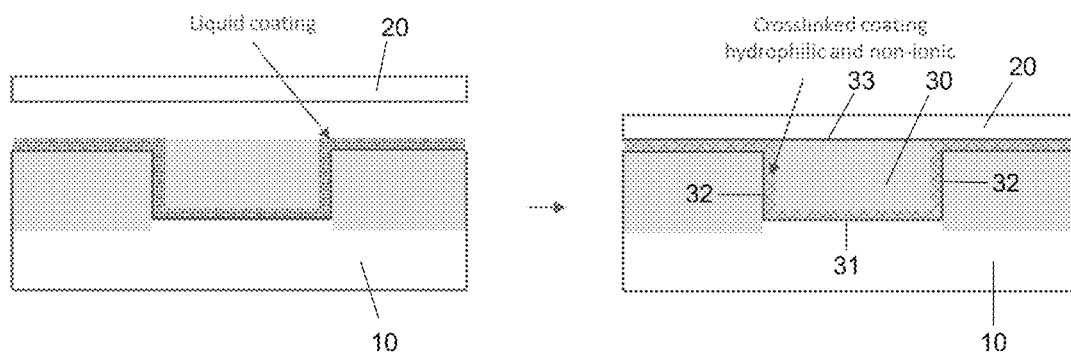
FIG. 8 shows the fabrication of a microfluidic device having a liquid coating on the bottom part (10) to prepare a device having a crosslinked coating on the bottom wall (31) and sidewalls (32) of the channel.
Figure 11:
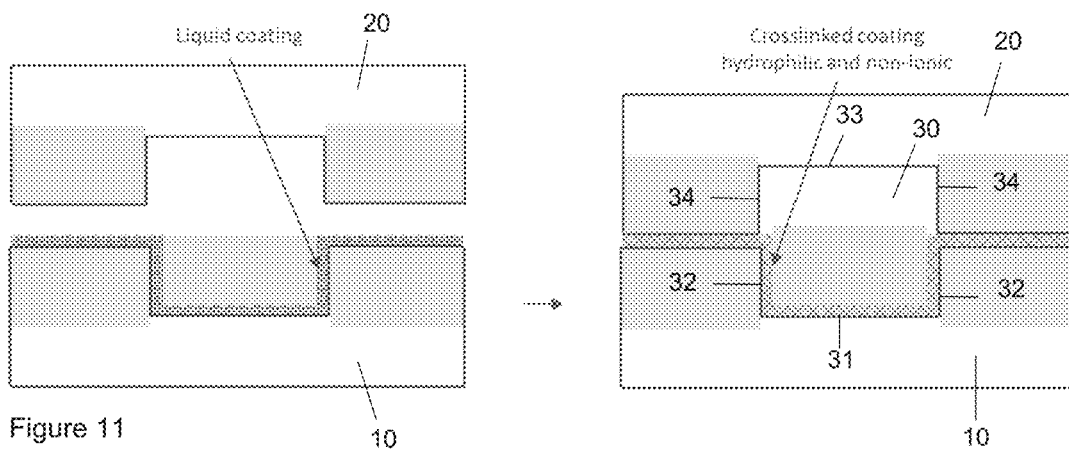
FIG. 11 shows the fabrication of a microfluidic device having a liquid coating on the bottom part (10) to prepare a device having a crosslinked coating on the bottom wall (31) and sidewalls (32) of the channel.

In an embodiment bottom wall (31) and sidewalls (32) are coated with the crosslinked composition (see FIGS. 8, 11).

Figure 7:
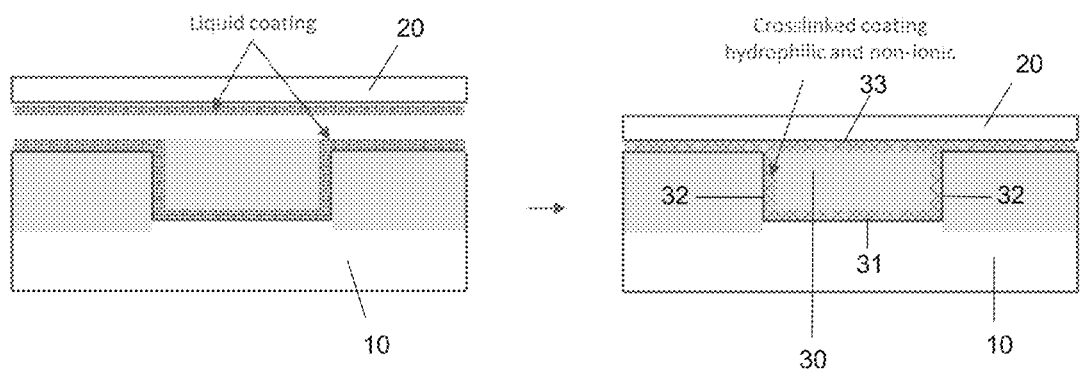
FIG. 7 shows the fabrication of a microfluidic device having a liquid coating on both the bottom part (10) and top part (20) to prepare a device having a crosslinked coating on all sides of the channel.

In an embodiment bottom wall (31), sidewalls (32) and top wall (33) are coated with the crosslinked composition (see FIG. 7).

Figure 9:
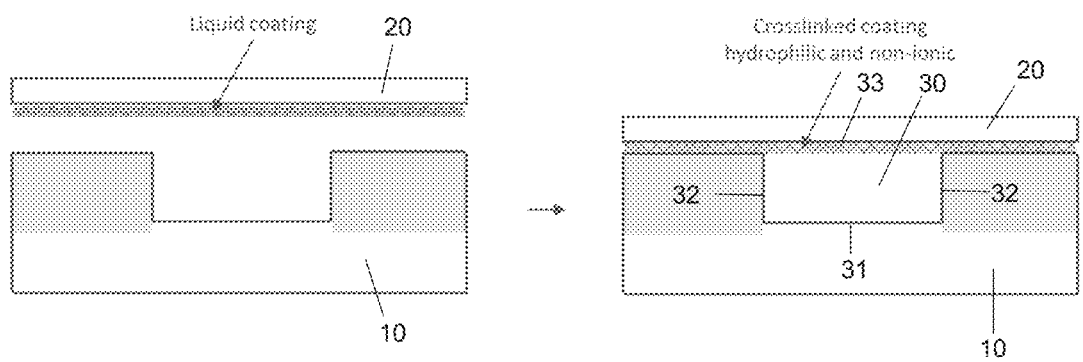
FIG. 9 shows the fabrication of a microfluidic device having a liquid coating on the top part (20) to prepare a device having a crosslinked coating on top wall (33) of the channel.

In an embodiment only top wall (33) is coated with the crosslinked composition (see FIG. 9).

Figure 10:
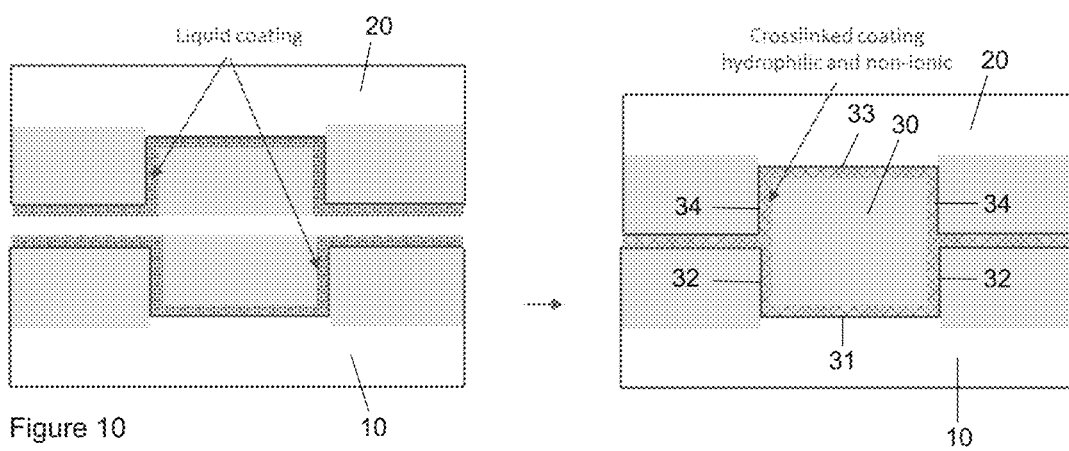
FIG. 10 shows the fabrication of a microfluidic device having a liquid coating on both the bottom part (10) and top part (20) to prepare a device having a crosslinked coating on all sides of the channel, including side walls (32) and (34).

In an embodiment bottom wall (31), top wall (33) and sidewalls (32) and (34) are coated with the crosslinked composition (see FIG. 10).

The bottom part (10) and top part (20) of the device are bonded together with a strong bond: the bottom part (10) and top part (20) are bonded together with a lap shear strength higher than 0.1 MPa.

The crosslinked composition comprises
i. between 2.5-90 mol % or between 10-90 mol % monomeric units A comprising one moiety —[CH$_2$—CR$_1$R$_2$]—, wherein R$_1$ represents H or CH$_3$ and R$_2$ represents —COO— or —CONH—, and a non-ionic hydrophilic moiety, and
ii. between 97.5-10 mol %, or between 90-10 mol % monomeric units B comprising two or more moieties represented by —[CH$_2$—CR$_1$R$_2$]—, wherein R$_1$ represents H or CH$_3$ and R$_2$ represents —COO— or —CONH—, and a non-ionic hydrophilic moiety.

Preferably the crosslinked composition comprises between 3-80 or 20-80 mol % monomeric units A and 97-20 mol % or 80-20 mol % monomeric units B. More preferably the crosslinked composition comprises 4-75 mol % or 25-75 mol % monomeric units A and 25-96 mol % or 75-25 mol % monomeric units B.

Preferably the crosslinked composition comprises mainly monomeric units A and monomeric units B: preferably at least 80 mol % of all monomeric units of the crosslinked coating consist of monomeric units A and B.

The mol % of monomeric moieties can be determined with 13C-NMR and/or 1H-NMR.

Preferably, the crosslinked composition comprises monomeric units A, which are obtained from polymerization of a monofunctional acrylate monomer containing a moiety made of repeating units of ethylene glycol, and monomeric units B, which are obtained from polymerization of a diacrylate monomer containing a moiety made of repeating units of ethylene glycol.

Preferably the monomeric unit A contains between 5-10 repeating units of ethylene glycol and the monomeric unit B contains between 2 and 4 repeating units of ethylene glycol.

The invention also relates to a microfluidic device comprising a bottom part (10), a top part (20) and a channel (30) having a bottom wall (31), sidewalls (32) and a top wall (33), wherein the bottom part (10) and top part (20) are bonded together with a crosslinked composition, wherein at least one of the bottom wall (31), sidewalls (32) and top wall (33) is coated with the crosslinked composition, wherein the crosslinked composition is obtained by crosslinking a composition comprising:
i) between 5-90 vol % monomeric units A comprising one moiety —[CH$_2$—CR$_1$R$_2$]—, wherein R$_1$ represents H or CH$_3$ and R$_2$ represents —COO— or —CONH—, and a non-ionic hydrophilic moiety; relative to the total volume of monomeric units A and monomeric units B
ii) between 10-95 vol % monomeric units B comprising two or more moieties represented by —[CH$_2$—CR$_1$R$_2$]—, wherein R$_1$ represents H or CH$_3$ and R$_2$ represents —COO— or —CONH—, and a non-ionic hydrophilic moiety, relative to the total volume of monomeric units A and monomeric units B.

It is noted that the invention relates to the subject-matter defined in the independent claims alone or in combination with any possible combinations of features described herein, preferred in particular are those combinations of features that are present in the claims. It will therefore be appreciated that all combinations of features relating to the composition according to the invention; all combinations of features relating to the process according to the invention and all combinations of features relating to the composition according to the invention and features relating to the process according to the invention are described herein.

It is further noted that the term 'comprising' does not exclude the presence of other elements. However, it is also to be understood that a description on a product/composition comprising certain components also discloses a product/composition consisting of these components. The product/composition consisting of these components may be advantageous in that it offers a simpler, more economical process for the preparation of the product/composition. Similarly, it is also to be understood that a description on a process comprising certain steps also discloses a process consisting of these steps. The process consisting of these steps may be advantageous in that it offers a simpler, more economical process.

When values are mentioned for a lower limit and an upper limit for a parameter, ranges made by the combinations of the values of the lower limit and the values of the upper limit are also understood to be disclosed.

The invention is now elucidated by way of the following experiments, without however being limited thereto.

strength. In some instances the assembly itself broke but the substrates did not come apart, indicating a lap shear strength higher than the applied stress. The values are mentioned in tables below. The values are the average and standard deviation of the measurement results of 5 samples. A lap shear strength of at least 0.1 MPa is considered sufficiently strong. Preferably, a lap shear strength higher than 0.2 MPa is obtained. More preferably, the lap shear strength is higher than 0.3 MPa.

| Experiments | | | |
|---|---|---|---|
| Chemical | CAS # | Abbreviation | provider |
| Methoxy poly(ethylene glycol) monoacrylate | 32171-39-4 | PEG9-Ac | Sigma-Aldrich |
| Poly(ethylene glycol) diacrylate | 26570-48-9 | PEG3-diAc | Sigma-Aldrich |
| 4-Arm PEG-Acrylate, MW 2k | N/A | PEG-tetraAc | Creative PEGWorks (PSB 420) |
| Ethylene glycol dimethacrylate | 97-90-5 | PEG1-diMAc | Sigma-Aldrich |
| Acrylate-PEG-Acrylate, MW 20k | N/A | PEG20k-diAc | Creative PEGWorks (PSB-349) |
| Methacrylate-PEG-Methacrylate, MW 20k | N/A | PEG20k-diMAc | Creative PEGWorks (PSB-3478) |
| Methoxy PEG methacrylate | 26915-72-0 | PEG9-MAC | |
| Tetrahydrofuran | 109-99-9 | THF | Sigma-Aldrich |
| Perfluorobenzophenone | 853-39-4 | F10-BP | Sigma-Aldrich |
| Benzophenone | 119-61-9 | BP | Sigma-Aldrich |
| diphenyl(2,4,6-trimethylbenzoyl)phosphine oxide | 75980-60-8 | TPO | Sigma-Aldrich |
| 2-hydroxy-4'-(2-hydroxyethoxy)-2-methylpropiophenone | 106797-53-9 | Irgacure ® 2959 | Sigma-Aldrich |

Experiment 1

Cyclic Olefin Copolymer (COC) microscope slides (25× 75 mm$^2$) with 4 parallel straight channels were used as substrates. The channels were 58 mm long, 1 mm wide and 100 μm deep. The substrates were activated by exposure to a low-pressure air plasma for 30 s. A coating composition was prepared consisting of PEG9-Ac (45 vol %) as monomer A, PEG3-diAc (45 vol %) as monomer B and THF (10 vol %) as a diluent. The coating composition was applied on both substrates by spin coating. The diluent evaporates during the spin coating. Thus, spin coating results in the presence of a liquid coating on the substrates without taking special measures for evaporating the diluent.

The substrates were then contacted with each other to form an assembly in which a microfluidic structure is defined by the concavity. The slides were contacted with an overlap area of 50×25 mm$^2$. Subsequently the assembly was irradiated with UV light (Hg/Xe lamp with a 280 nm high-pass cutoff filter) for 1 hour using a collimated light beam. During irradiation, an external pressure of 0.32 MPa was continuously applied. To ensure the channels are not clogged, a flow of nitrogen was applied through the channel during irradiation. After irradiation, the assemblies were characterized without further treatment.

Bond Strength Characterization

The assemblies obtained above were subjected to lap shear tests using a Zwick Z010 materials tester. The substrates are pulled apart at a fixed speed of 0.5 mm/s and the shear stress (expressed in MPa, force per unit bond area) is recorded as a function of the applied strain. The stress at which the substrates in the assemblies are pulled apart is taken as the lap shear strength and is a measure for the bond Coating Characterization To demonstrate the formation of a hydrophilic PEG coating on the channel wall, the wettability of coated and (commercially available) uncoated channels was compared. The meniscus of a water droplet in the channel shows that the coated channel is very hydrophilic (see FIG. 1), with a water contact angle (WCA) of <40°. The uncoated channel on the other hand, shows a contact angle of approximately 90°, as expected for the untreated hydrophobic COC.

Figure 2:
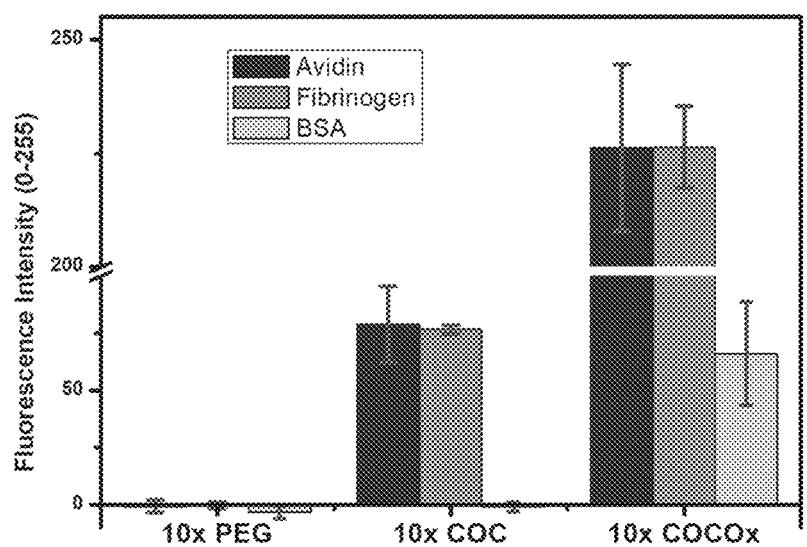
FIG. 2 shows Avidin, Fibrinogen, and BSA fouling behavior in COC microfluidic devices that are bonded and coated with PEG (left), untreated (middle, COC), and activated with oxidizing air plasma (right, COCOx).

To demonstrate the antifouling properties of the hydrophilic PEG coating, solutions of fluorescently labelled proteins were flushed through the channels, followed by rinsing with buffer solutions with and without added surfactant, and water. Then, the fluorescence intensity inside the channels was measured using a fluorescence microscope. The results of these experiments (average fluorescence intensity and standard deviation of 12 spots in 4 channels) are shown in FIG. 2. Uncoated COC channels show a measurable fluorescence, indicating adsorption of the proteins to the channel wall. The PEG-coated channels, on the other hand, show a greatly reduced fluorescence intensity, which is in fact similar to the background signal. This result clearly indicates that the PEG coating prevents protein adsorption. As a control, bonded chips which were activated by exposure to oxidizing air plasma but not coated with PEG were also measured. These oxidized samples have a very high surface energy, leading to strong protein adsorption and a very high fluorescence intensity.

Scanning Electron Microscopy

Figure 3:
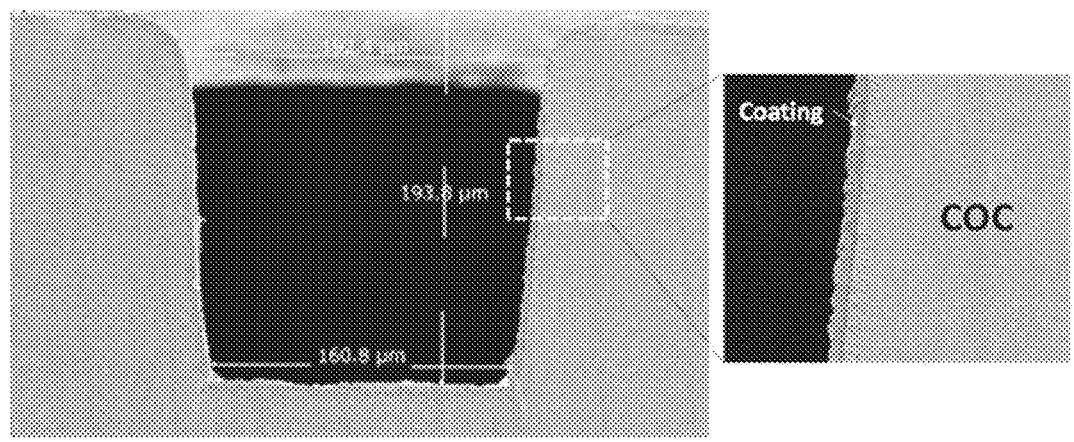
FIG. 3 shows the Visualization by SEM of a PEG-coated channel. The crosslinked coating is visible as a thin, uniform, conformal layer on the channel walls.

Selected samples were visualized by Scanning Electron Microscopy (SEM) to confirm that all walls of the channel are coated uniformly and conformally. FIG. 3 shows a cross section of a coated channel with nominal dimensions of 200×200 µm² (height×width at top). The cross section was prepared by freezing the sample in liquid nitrogen followed by application of pressure on the normal axis of the top surface while half of the bottom surface was made immobile by means of a support surface, which resulted in cracking of the device along the longitudinal plane and subsequent delamination of the bonded top substrate. In the SEM micrograph of this longitudinal cross-section, the presence of the PEG coating on the side and bottom walls of the channel can be observed. The coating layer has a uniform thickness of a few micrometers on all walls and is also present conformally in the corners between the side walls and the bottom wall of the channel.

In subsequent experiments, several parameters were varied to demonstrate different embodiments of the invention. Unless stated otherwise, the first and the second substrates were COC substrates as described above; the coating composition used consists of PEG9-Ac (45 vol %), PEG3-diAc (45 vol %) and THF (10 vol %); the UV irradiation was for 1 hour at an external pressure of 0.32 MPa.

Externally Applied Pressure (Experiments 1-6)

The assembly was irradiated while applying a varying external pressure on the substrates that are being bonded.

TABLE 1

| Experiment # | External pressure (MPa) | lap shear strength (MPa) |
| --- | --- | --- |
| 1 | 0.32 | 0.7 ± 0.2 |
| 2 | 0.00 | 0.67 ± 0.09 |
| 3 | 0.08 | 0.57 ± 0.06 |
| 4 | 0.16 | 0.8 ± 0.2 |
| 5 | 0.24 | 0.7 ± 0.1 |
| 6 | 0.40 | 0.6 ± 0.1 |

Pressures between 0 and 0.4 MPa were applied (experiments 1-6). Strong bonding is observed at all applied pressures. A strong bond (average lap shear strength 0.67 MPa) was formed even when the substrates are contacted without applying any external pressure (experiment 2).

The lack of necessity for application of high external pressure ensures that there is minimal deformation of any microstructures within the microfluidic device. This is in contrast to common methods of solvent bonding and thermal bonding, which typically require the application of external pressure to achieve a sufficiently high bond strength. These methods therefore often yield significant deformation of microfluidic structures which may affect the performance of the bonded device.

Monomer Ratio (Experiments 5, 7-11)

The weight ratio of the mono-functional monomer and the multi-functional monomer was varied.

TABLE 2

| Experiment # | Monomer A vol % | monomer B vol % | THF vol % | lap shear strength (MPa) | Optical transparency |
| --- | --- | --- | --- | --- | --- |
| CE7* | 90 | 0 | 10 | 0.21 ± 0.04 | bad |
| CE8* | 0 | 90 | 10 | 0.9 ± 0.1 | bad |
| 9 | 60 | 30 | 10 | 0.7 ± 0.2 | good |
| 10 | 30 | 60 | 10 | 0.91 ± 0.02 | good |

TABLE 2-continued

| Experiment # | Monomer A vol % | monomer B vol % | THF vol % | lap shear strength (MPa) | Optical transparency |
| --- | --- | --- | --- | --- | --- |
| 11 | 22.5 | 67.5 | 10 | 0.67 ± 0.09 | good |
| 5 | 45 | 45 | 10 | 0.7 ± 0.2 | good |

Note:
experiments marked with * are comparative experiments and are not processes according to the invention.

It was found that using only a monofunctional acrylic monomer containing PEG moieties (experiment CE7) results in an average lap shear strength 0.21 MPa. This bond strength is weak compared to experiments with mixtures of mono- and multifunctional monomers. Also, the crosslinked coating blocks a significant amount of light (>20% in comparison to an uncoated COC-substrate) at wavelengths below 370 nm (FIG. 4), which is undesirable.

Figure 4:
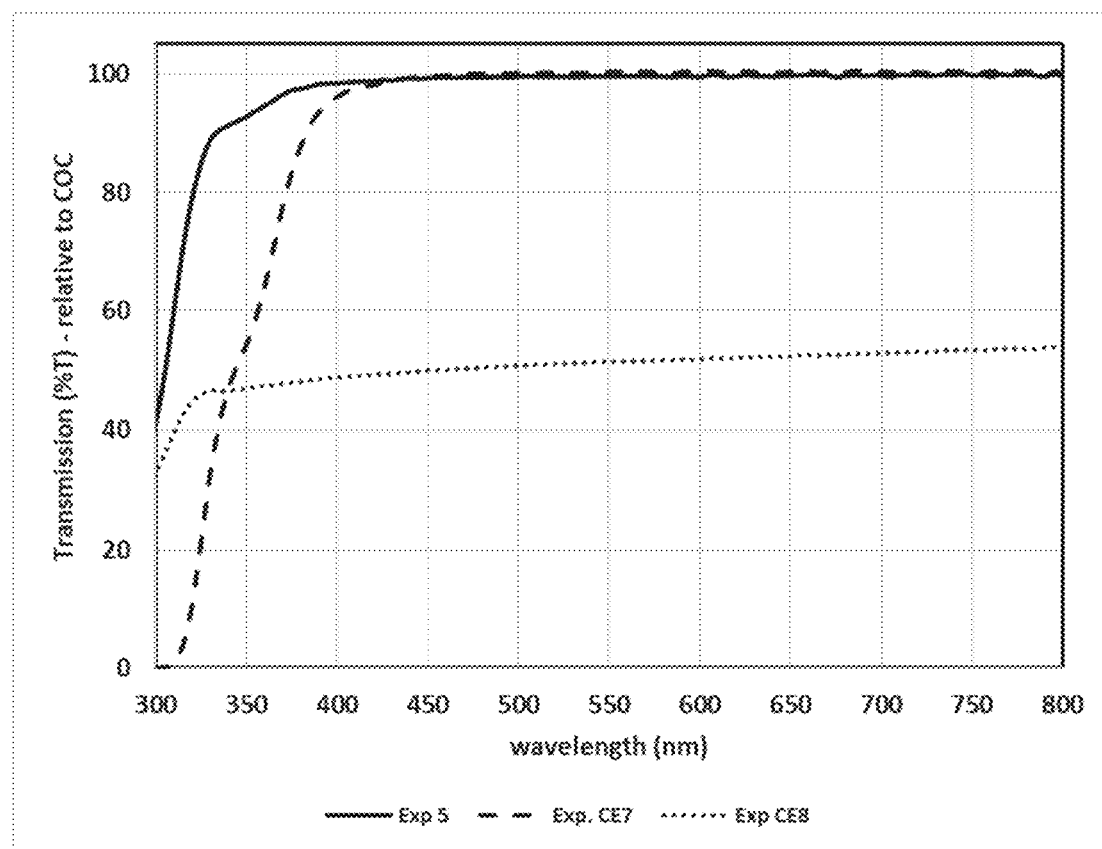
FIG. 4 shows an Optical transmission spectrum of crosslinked coatings according to experiments 5, CE7, and CE8.

When using only a multifunctional acrylic monomer containing PEG moieties (experiment CE8), strong bonding was observed (average lap shear strength 0.9 MPa), but the optical transparency of the crosslinked coating was seriously compromised due to the high level of crosslinking. This is shown in FIG. 4, which shows a transmission of <60% for all wavelengths between 300 and 800 nm.

When mixtures of varying ratios of mono- and multifunctional acrylic monomers with PEG moieties were used (experiments 5, 9-11), strong bonding was achieved without reducing the optical transparency of the crosslinked coating. FIG. 4 shows that the transmission is >80% for all wavelengths between 320 and 800 nm.

Irradiation

Irradiation without Photoinitiator, Varied Irradiation Time (Experiments 10, 12, 13)

The irradiation time was varied.

TABLE 3

| Experiment # | Monomer A vol % | monomer B vol % | THF vol % | UV Time (s) | lap shear strength (MPa) |
| --- | --- | --- | --- | --- | --- |
| 12 | 30 | 60 | 10 | 600 | 0.2 ± 0.1 |
| 13 | | | | 1800 | 0.35 ± 0.09 |
| 10 | | | | 3600 | 0.91 ± 0.02 |

For industrial application, it is preferable to have a short irradiation time. It was found that compared to experiment 10 the irradiation time can be significantly reduced without making any further changes to the process and still achieve sufficiently strong bonding (experiments 12, 13).

Irradiation with Photoinitiator, Varied Irradiation Time (Experiments 14-28)

A photoinitiator was added to the liquid composition and the irradiation time was varied.

TABLE 4

| Experiment # | Monomer A vol % | monomer B vol % | THF vol % | Photo-initiator | wt % | UV time(s) | lap shear strength (MPa) |
|---|---|---|---|---|---|---|---|
| 14 | 30 | 60 | 10 | F10-BP | 2 | 5 | 0.16 ± 0.06 |
| 15 | | | | | | 30 | 0.3 ± 0.1 |
| 16 | | | | | | 60 | 0.37 ± 0.02 |
| 17 | | | | | | 600 | 0.72 ± 0.05 |
| 18 | | | | | | 1800 | 0.7 ± 0.2 |
| 19 | | | | | | 3600 | 0.70 ± 0.2 |

It was found that perfluorobenzophenone (F10-BP) is a suitable photoinitiator. When 2 wt. % of F10-BP is added to the liquid composition, the irradiation time can be greatly reduced while maintaining a sufficiently high bond strength (experiments 14-19).

Irradiation with Photoinitiator, Varied Amount (Experiments 22-26)

The amount of F10-BP was varied at a fixed irradiation time of 300 s (experiments 20-24).

TABLE 5

| Experiment # | monomer A vol % | monomer B vol % | THF vol % | Photo-initiator | wt % | UV Time(s) | lap shear strength (MPa) |
|---|---|---|---|---|---|---|---|
| 20 | 30 | 60 | 10 | F10-BP | 0.1 | 300 | 0.46 ± 0.06 |
| 21 | | | | | 1 | | 0.6 ± 0.1 |
| 22 | | | | | 2 | | 0.57 ± 0.08 |
| 23 | | | | | 5 | | 0.53 ± 0.08 |
| 24 | | | | | 10 | | 0.53 ± 0.07 |

It was found that at this irradiation time, sufficiently strong bonding can be achieved at photoinitiator concentrations between 0.1 and 10 wt. %.

Irradiation with Photoinitiator, Varied Type of Photoinitiator (Experiments 27-30) the Type of the Photoinitiator was Varied (Experiments 25-28).

TABLE 6

| Experiment # | Monomer A vol % | Monomer B vol % | THF vol % | Photo-initiator | wt. % | UV Time(s) | lap shear strength (MPa) |
|---|---|---|---|---|---|---|---|
| 25 | 22.5 | 67.5 | 10 | TPO | 2 | 60 | 0.41 ± 0.06 |
| 26 | | | | Irgacure ® 2959 | 2 | 60 | 0.49 ± 0.04 |

It was found that the addition of 2 wt. % of diphenyl(2,4,6-trimethylbenzoyl) phosphine oxide (TPO) and 2-hydroxy-4'-(2-hydroxyethoxy)-2-methylpropiophenone (IRGACURE® 2959) results in strong bonding at an irradiation time of only 1 minute (experiments 25, 26).

Partial Irradiation

Figure 5:
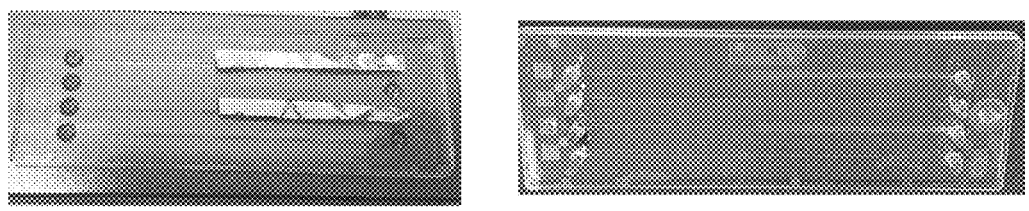
FIG. 5 shows Partial irradiation by masking a part of the substrate (left) results in bonded devices with channels with a partial hydrophilic coating. The uncoated part remains hydrophobic and does not allow the capillary flow of water to continue (right).

In another experiment, a photomask was used to partially block the UV light, leaving part of the channels uncoated (see FIG. 5). For this experiment, the coating composition and process parameters of experiment 22 were used. The coated part of the channels is hydrophilic and can thus be filled by capillary force by simply applying a droplet of water on the inlet. Since uncoated COC is hydrophobic, this also serves as a barrier, effectively stopping the flow of water when it reaches the end of the coated area. As expected, fully irradiated and thus fully coated channels are completely filled.

This result shows that the process according to the invention can be used to achieve patterned coating and bonding of a microfluidic device in a single step.

Substrate Material (Experiments 27-33)

The substrate material was varied (experiments 27-33). PEG9-Ac (22.5 vol %) was used as monomer A. The coating composition further comprised 67.5 vol % of different monomers B, 10 vol % of THE, and 1 wt. % of F10-BP. UV irradiation was applied for 60 seconds while applying an external pressure of 0.32 MPa.

TABLE 7

| Experiment # | substrate 1 | substrate 2 | Monomer B | lap shear strength (MPa) |
|---|---|---|---|---|
| 27 | COP | COP | PEG3-diAc | 0.33 ± 0.07 |
| 28 | PMMA | PMMA | | 0.63 ± 0.03 |
| 29 | COC | PMMA | | 0.58 ± 0.02 |
| CE30* | Glass | Glass | | 0.06 ± 0.06 |
| 31 | Glass-PEG | Glass-PEG | PEG-tetraAc | 0.11 ± 0.01 |
| 32 | Glass-PEG | COC | | 0.19 ± 0.03 |
| 33 | Glass-PEG | COC | PEG3-diAc | 014 ± 0.03 |

Beside COC, also other substrate materials may be used in the process according to the invention. Examples of suitable substrate materials include Cyclic Olefin Polymer (COP, experiment 27), and poly(methyl methacrylate) (PMMA, experiment 28). In this experiment, the substrates were not activated before applying the liquid composition, thus demonstrating that activation of the surface is not required for successful bonding of substrates. The process according to the invention may also be used to coat and bond dissimilar materials, for example COC and PMMA (experiment 29).

The process according to the invention may also be used to coat and bond inorganic materials, such as glass. However, the average lap shear strength for glass-glass bonding (0.06 MPa, experiment CE30) is much lower than for the polymer substrates and does not yield sufficiently strong bonding. The bond strength for glass and other inorganic substrates can be increased by preparing an organic surface modification layer on the glass surface before application of the liquid composition. For example, processes for creating alkoxy- or chlorosilane layers on hydroxylated glass (Si—OH) and other oxide surfaces are well known in the art and may be used for this purpose. In experiments 31-33, a layer of PEG-triethoxysilane was created on the surface of the glass substrates, thus providing glycol (—$H_2C$—$H_2C$—O—) groups on the surface. The PEG layer provides a better anchoring point for grafting of the acrylic monomers than the silanol groups on the bare glass surface. In these experiments, sufficiently high lap shear strengths above 0.1 MPa are obtained.

Monomer Type (Experiments 34-37)

The type of monomer was varied (experiments 34-37). COC substrates were used for these experiments. UV irradiation was applied for 60 seconds while applying an external pressure of 0.32 MPa.

TABLE 8

| Experiment # | Mono-functional monomer | vol % | Multi-functional monomer | vol % | additive | vol % | Photo-initiator | wt % | lap shear strength (MPa) |
|---|---|---|---|---|---|---|---|---|---|
| 34 | PEG9-Ac | 22.5 | PEG-tetraAc | 67.5 | THF | 10 | F10-BP | 2 | 0.19 ± 0.03 |
| 35 | PEG9-MAc | 22.5 | PEG1- diMAC | 67.5 | THF | 10 | F10-BP | 2 | 0.5 ± 0.2 |
| CE36* | — | — | PEG2 0k- diAc | 100 | — | — | — | — | no bond |
| CE37* | — | — | PEG2 0k- diMAc | 100 | — | — | — | — | no bond |

A variety of monomers A and B can be used in the process according to the invention. For example, the bifunctional monomer PEG3-diAc that is used in most experiments may be replaced by multifunctional monomers with a different number of acrylic groups, for example the tetrafunctional monomer PEG-tetraAc (experiment 34). Experiment 35 shows that methacrylate monomers may also be used instead of acrylate monomers in the process according to the invention.

The number of glycol (—$H_2C$—$H_2C$—O—) units per monomer may also be varied, as long as the composition remains liquid after evaporation of the diluent. When very long PEG monomers are used that are solid at room temperature (for example monomers having a molecular weight of approximately 20 kDa), no bond is formed between the substrates (experiments CE36, CE37).

Presence of Diluent (Experiments 38-41)

The type and amount of diluent was varied (Experiments 38-41). COC substrates were used for these experiments. UV irradiation was applied for 60 seconds while applying an external pressure of 0.32 MPa.

TABLE 9

| Experiment # | Mono-functional monomer | vol % | Multi-functional monomer | vol % | additive | vol % | Photo-initiator | wt % | lap shear strength (MPa) |
|---|---|---|---|---|---|---|---|---|---|
| 38 | PEG9-Ac | 22.5 | PEG3- diAc | 67.5 | none | N/A | 10-BP | 2 | 0.52 ± 0.09 |
| CE39* | PEG9-Ac | 22.5 | PEG3- diAc | 67.5 | water | 10 | Irgacure ® 2959 | 2 | opaque hydrogel |
| CE40* | PEG9-MAc | 10 | PEG1- diMAc | 10 | water | 80 | Irgacure ® 2959 | 2 | 0.08 ± 0.02 |
| CE41* | PEG9-Ac | 10 | PEG3- diAc | 10 | water | 80 | Irgacure ® 2959 | 2 | 0.03 ± 0.01 |

The presence of a diluent in the liquid composition is optional. THF has been used as a diluent in most experiments, but experiment 38 demonstrates that the process also works without the presence of THF. In most experiments, 10 vol % of THF was used, but this amount may be adjusted.

The role of the diluent may be to facilitate application of the liquid composition and/or spreading of the liquid composition on the substrate surface by reducing the viscosity.

However, it should not interfere with the process during the steps of contacting the substrates and irradiation of the assembly. In the case of THF and other volatile organic compounds, the diluent will disappear from the liquid composition by evaporation before the substrates are contacted and the assembly is irradiated. Therefore, THF and other suitable volatile organic compounds may be used as a component of the liquid composition.

For comparison, water was used instead of THF (experiments CE39-CE41). Water is much less volatile than THF and will not evaporate from the liquid composition during the process (at room temperature). Therefore, water is still present in the liquid composition during contacting of the substrates and irradiation of the assembly, and interferes with the coating and bonding process. Instead of forming a strong bond between the substrates, a hydrogel is formed which results in weak bonding (lap shear strength<0.1 MPa) and/or a loss of transparency.

Coating and bonding of a microfluidic flow cell onto a photonic biochip (experiment 42) The process according to the invention was used to coat and bond a microfluidic flow channel made from COC to a photonic biosensor chip (experiment 44). The biosensor chip comprises a silicon substrate with silicon nitride waveguides embedded in a silicon oxide cladding. The silicon oxide surface of the biosensor chip was modified using a PEG-silane (2-[Methoxy (polyethyleneoxy) propyl]dimethylsilane, 6-9 ethyleneoxy units) to create a PEG layer on the surface. The liquid composition was applied to the surface of the flow cell by spin coating. The coating composition comprised PEG9-Ac (22.5 vol %) as monomer A, PEG3-diAC (67.5 vol %) as monomer B, THF (10 vol %) as a diluent, and 2 wt. % of F10-BP as photo-initiator. The flow cell and the biosensor chip were contacted without applying any external pressure and irradiated for 10 minutes.

Figure 6:
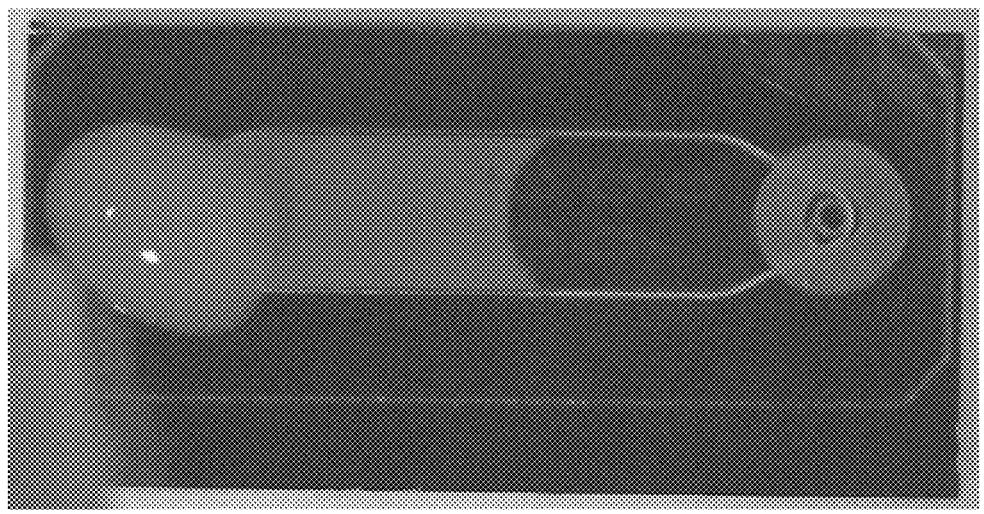
FIG. 6 shows Capillary flow of an aqueous dye solution (a droplet of which is visible on the left) through a COC with one concavity on top of a silicon oxide photonic sensor and bonded thereto by a process according to the invention. A microchannel is formed between the COC substrate and the silicon oxide photonic sensor as the second substrate. An inlet to the channel is present on the left hand side and an outlet (visible as a small hole) on the right hand side of the flow cell). It can be seen that the solution is present in the channel, which, together with the shape of the meniscus of the solution confirms that the channel is hydrophilic as a result of the coating. No leaking was observed.

No lap shear strength testing can be performed on this sample. Therefore, a different characterization method was employed to demonstrate the simultaneous bonding and coating of the device. An aqueous dye solution was introduced by pipetting a droplet of the dye solution on the inlet of the flow cell. As shown in FIG. 6, the flow channel is readily filled by capillary action without applying any external pressure, thus demonstrating the presence of the hydrophilic PEG coating on the channel walls. The hydrophilicity of the flow channel walls can also be deduced from the contact angle of the dye solution with the side walls of the channel.

No leakage of the bonded flow cell was observed when flowing liquids through the channel, even when applying external pressure up to 1000 mbar. Thus, it is clearly demonstrated that the bond between the sensor chip and the flow cell is strong enough for common microfluidic applications, which typically require pressures well below 1 bar. Application of Liquid Composition by Spray Coating (Example 43)

A COC substrate (25×75 mm$^2$) with 4 parallel straight channels was used as the bottom part, and COC foil (125 µm thickness) as the top part. On the bottom part the channels were 58.5 mm long, 1 mm wide, and 200 µm deep. The substrates were cleaned by ultrasonication in acetone and dried by a nitrogen flow. The substrates were activated by exposure to a low-pressure air plasma for 60 s. A coating composition was prepared containing PEG9-Ac (6 vol %) as monomer A, PEG3-diAc (64 vol %) as monomer B, THF (30 vol %) as a diluent, and 0.8 w/v % of benzophenone (BP) as photo-initiator.

The coating composition was applied on the substrates by spray coating, during which the diluent evaporates. This results in the formation of a liquid coating on flat parts of the substrates and the walls of the channels without completely filling the channels. No additional steps were taken for evaporating the diluent or avoiding channel clogging. The substrates were then contacted with each other to form an assembly, and the assembly was irradiated with UV light (365 nm, 40 W) through a quartz mask for 5 min under an argon flow. Bonded channels were then characterized without further rinsing, washing or other treatments.

To demonstrate the formation of a hydrophilic PEG coating on the channel walls, the wettability of coated and uncoated COC channels (commercially available) was compared. A droplet of water or an aqueous dye solution was deposited on the inlet of the coated and uncoated channels. The coated channels are readily filled by capillary action without applying any external pressure, thus demonstrating the presence of the hydrophilic PEG coating on the channel walls. The contact angle of water with the side walls of the coated channels is <40°. In contrast, the uncoated COC channels are hydrophobic, and are not filled by capillary action when a water droplet is deposited on the inlet.

What is claimed is:

1. A process for manufacturing a microfluidic device comprising:
    a) providing a first substrate having a first surface comprising a first flat part and a first concavity and a second substrate having a second surface comprising a second flat part and an optional second concavity, wherein each of the first flat part, the first concavity and the second flat part has surface groups selected from alcohol, aldehyde, carboxylic acid, ether, epoxide, alkene, alkyne, secondary or tertiary carbon atoms, arynes, azides, imines, phosphates, sulfonyl fluorides, N-sulfonylimines, vinylsilyl, quinones, phenones, hydrazones, or a combination thereof;
    b) coating at least one of the first surface and the second surface with a coating composition comprising
        i) a monomer A comprising one moiety represented by $CH_2\!\!=\!\!CR_1R_2$ wherein $R_1$ represents H or $CH_3$ and $R_2$ represents —COO— or —CONH—, and a non-ionic hydrophilic moiety;
        ii) a monomer B comprising two or more moieties represented by $CH_2\!\!=\!\!CR_1R_2$ wherein $R_1$ represents H or $CH_3$ and $R_2$ represents —COO— or —CONH—, and a non-ionic hydrophilic moiety;
        iii) optionally a photoinitiator; and
        iv) optionally a diluent;
    c) evaporating the diluent, if present, and forming a liquid coating;
    d) contacting the substrates so as to obtain an assembly in which the first flat part and the second flat part contact each other to define a microfluidic structure between the first and the second surfaces, wherein the microfluidic structure comprises the first concavity and the optional second concavity; and
    e) at least partially irradiating the assembly with light having a wavelength between 200 and 800 nm to crosslink the liquid coating to bond the first flat part and the second flat part and obtain a crosslinked coating on at least the first concavity,
    wherein at least one of the first substrate and the second substrate is transparent to said light.

2. The process according to claim 1, wherein the first flat part, the first concavity and the second flat part have surface groups selected from alcohol, aldehyde, carboxylic acid, ether, epoxide, alkene, alkyne, and secondary or tertiary carbon atoms, or a combination thereof.

3. The process according to claim 1, wherein at least one of the substrates is made of a polymer, wherein the polymer is a polyolefin, polyester, polyether, polyamide, polycarbonate, polysulfone, polyurethane, (meth)acrylate, (meth)acrylamide, polysaccharide, or polyalcohol.

4. The process according to claim 3, wherein the polymer is a cyclic olefin copolymer (COC), cyclic olefin polymer (COP), polycarbonate (PC), polystyrene (PS), poly(methyl methacrylate) (PMMA), SU-8, polyethylene or polypropylene.

5. The process according to claim 1, wherein at least one of the substrates is an inorganic material, wherein the inorganic material is glass, silicon, silicon oxide, or silicon nitride.

6. The process according to claim 1, wherein monomer A is selected from acrylate, methacrylate, acrylamide or methacrylamide monomers.

7. The process according to claim 6, wherein the monomer A is the acrylate monomers or the methacrylate monomers.

8. The process according to claim 1, wherein the non-ionic hydrophilic moiety in monomer A and monomer B is made of repeating units selected from ethylene glycol, propylene glycol, or glycerol, or oligomers of (2-hydroxyethyl)acrylate, (2-hydroxyethyl)methacrylate, (2-hydroxyethyl)acrylamide, (2-hydroxyethyl)methacrylamide, (2-hydroxypropyl)acrylate, (2-hydroxypropyl)methacrylate, (2-hydroxypropyl)acrylamide, (2-hydroxypropyl)methacrylamide, N-isopropylacrylamide, 2-methyl-2-oxazoline, 2-ethyl-2-oxazoline, N-vinylpyrrolidone, N-vinyl acetamide, vinyl alcohol, vinyl acetate, vinyl butyral or amino acids.

9. The process according to claim 8, wherein the non-ionic hydrophilic moiety in monomer A and monomer B is made of repeating units of ethylene glycol.

10. The process according to claim 1, wherein monomer A is a monofunctional acrylate monomer containing a moiety made of repeating units of ethylene glycol.

11. The process according to claim 1, wherein the coating composition comprises a crosslinking monomer B comprising two or more moieties represented by $CH_2=CR_1R_2$ wherein $R_1$ represents H or $CH_3$ and $R_2$ represents —COO— or —CONH—, and one or more non-ionic hydrophilic moieties, and wherein the number of moieties represented by $CH_2=CR_1R_2$ in the monomer B is between 2 and 8.

12. The process according to claim 1, wherein the monomer B is selected from acrylate, methacrylate, acrylamide or methacrylamide monomers.

13. The process according to claim 12, wherein the monomer B is the acrylate monomers or the methacrylate monomers.

14. The process according to claim 1, wherein the monomer B is a diacrylate monomer containing a moiety made of repeating units of ethylene glycol.

15. The process according to claim 1, wherein the number of repeating units in the non-ionic hydrophilic moiety in the monomer A or the monomer B is selected between 1 and 20.

16. The process according to claim 1, wherein the monomer A has 6-10 ethylene glycol units and the monomer B has 1-5 ethylene glycol units.

17. The process according to claim 1, wherein the monomers A and B are both liquid at room temperature, with a viscosity<1000 mPa s.

18. The process according to claim 1, wherein the amount of monomer A ranges between 5 and 90 vol % relative to the total volume of the monomers A and B.

19. The process according to claim 1, wherein, the amount of monomer B ranges between 10 and 95 vol % relative to the total volume of the monomers A and B.

20. The process according to claim 1, wherein the coating composition comprises 0.1 to 10 wt. % of the photoinitiator, relative to the total weight of the monomers A and B and the photoinitiator.

21. The process according to claim 20, wherein the photoinitiator is a Norrish type I photoinitiator or a Norrish type II photoinitiator.

22. The process according to claim 21, wherein the Norrish type I photoinitiator is an acetophenone or phosphine oxide, and wherein the Norrish type II photoinitiator is 2-hydroxy-4'-(2-hydroxyethoxy)-2-methylpropiophenone, diphenyl(2,4,6-trimethylbenzoyl)phosphine oxide, 2,2-Dimethoxy-2-phenylacetophenone, benzophenone, or perfluorobenzophenone.

23. The process according to claim 1, wherein the coating composition comprises the diluent, wherein the amount of diluent ranges between 0.1 and 20 vol % for application by spin coating, and ranges between 50 and 99 vol % for application by spray coating, wherein the amount of the diluent is relative to the total volume of the coating composition.

24. The process according to claim 1, wherein the diluent is present and is tetrahydrofuran, diethyl ether, methanol, ethanol, diethylene glycol diethyl ether, diethylene glycol dimethyl ether, dioxane, 2-butanone, dimethoxyethane, ethyl acetate, methoxyacetone, propylene glycol monomethyl ether acetate, methyl isobutyl ketone, ethyl butyrate, methoxy propyl acetate, propyl acetate, or 2-butoxyethyl acetate, and wherein the diluent is tetrahydrofuran (THF) or diethyl ether when using COC as a substrate.

25. The process according to claim 1, wherein the thickness of the liquid coating is between 100 nm and 20 μm.

26. The process according to claim 1, wherein the diluent is present, and wherein the amount of the diluent in the liquid coating on the at least one of the first surface and the second surface of the substrate is less than 5 vol % relative to the liquid coating.

27. The process according to claim 1, wherein during steps d) and/or e) an external pressure is applied below 0.8 MPa.

28. The process according to claim 1, wherein the liquid coating composition is cured in step e) with an energy of at least 10 mJ/cm$^2$, by irradiation of light having a wavelength between 250-400 nm.

29. The process according to claim 1, wherein the liquid coating composition is not pre-cured prior to step e).

30. The process according to claim 1, wherein the number of repeating units in the non-ionic hydrophilic moiety in the monomer A or the monomer B is selected between 2 and 10, and wherein monomer A has 7 to 9 ethylene glycol units and the monomer B has 2 to 4 ethylene glycol units.

31. The process according to claim 1, wherein the monomers A and B are both liquid at room temperature, with a viscosity<200 mPa s, and wherein the amount of monomer A ranges between 10 to 50 vol %, relative to the total volume of the monomers A and B.

* * * * *